(12) United States Patent
Engstrom et al.

(10) Patent No.: US 7,904,065 B2
(45) Date of Patent: Mar. 8, 2011

(54) SERVING DATA/APPLICATIONS FROM A WIRELESS MOBILE PHONE

(75) Inventors: G. Eric Engstrom, Kirkland, WA (US); Peter Zatloukal, Kirkland, WA (US); Guy David-Byron Shefner, Bellevue, WA (US); Paul R. Nash, Bellevue, WA (US)

(73) Assignee: Varia Holdings LLC, Brooklyn, NY (US)

( * ) Notice: Subject to any disclaimer, the term of this patent is extended or adjusted under 35 U.S.C. 154(b) by 1302 days.

(21) Appl. No.: 11/158,308

(22) Filed: Jun. 21, 2005

(65) Prior Publication Data

US 2006/0023699 A1 Feb. 2, 2006

Related U.S. Application Data

(60) Provisional application No. 60/581,864, filed on Jun. 21, 2004.

(51) Int. Cl.
*H04L 29/06* (2006.01)
(52) U.S. Cl. .................. 455/414.3; 370/230; 370/235; 370/352; 370/389; 370/400; 455/412.1; 455/414.1; 455/420; 455/466; 455/556.1; 379/88.13; 379/88.17; 379/201.01; 709/203; 709/219; 709/229; 709/232; 709/243
(58) Field of Classification Search ............... 379/88.13, 379/88.17, 201.01; 455/412.1, 414.1, 414.3, 455/420, 466, 556.1; 709/201–203, 217–219, 229, 243–244, 231–232; 370/230, 235, 351–356, 389, 400
See application file for complete search history.

(56) References Cited

U.S. PATENT DOCUMENTS

| | | | |
|---|---|---|---|
| 6,549,773 B1 * | 4/2003 | Linden et al. | 455/426.1 |
| 6,732,105 B1 * | 5/2004 | Watson et al. | 707/10 |
| 6,865,608 B2 * | 3/2005 | Hunter | 709/229 |
| 6,895,425 B1 * | 5/2005 | Kadyk et al. | 709/203 |
| 6,973,485 B2 * | 12/2005 | Ebata et al. | 709/219 |
| 7,103,333 B2 * | 9/2006 | Lazaridis et al. | 455/412.1 |
| 7,293,271 B2 * | 11/2007 | Trossen et al. | 719/318 |
| 7,400,897 B2 * | 7/2008 | Lazaridis | 455/507 |
| 7,409,208 B1 * | 8/2008 | Clare et al. | 455/419 |
| 7,613,810 B2 * | 11/2009 | Romero et al. | 709/229 |
| 2002/0007379 A1 * | 1/2002 | Wang et al. | 707/515 |
| 2002/0055351 A1 * | 5/2002 | Elsey et al. | 455/414 |
| 2002/0059367 A1 * | 5/2002 | Romero et al. | 709/203 |
| 2003/0028612 A1 * | 2/2003 | Lin et al. | 709/217 |
| 2004/0122965 A1 * | 6/2004 | Apfel | 709/219 |
| 2005/0014489 A1 * | 1/2005 | Zhigang | 455/414.2 |
| 2005/0033852 A1 * | 2/2005 | Tenhunen | 709/229 |
| 2005/0071421 A1 * | 3/2005 | Calo et al. | 709/203 |
| 2006/0094403 A1 * | 5/2006 | Norefors et al. | 455/411 |
| 2007/0165579 A1 * | 7/2007 | Delibie et al. | 370/338 |
| 2007/0202884 A1 * | 8/2007 | Nykanen et al. | 455/455 |

* cited by examiner

*Primary Examiner* — Hemant Patel
(74) *Attorney, Agent, or Firm* — Schwabe, Williamson & Wyatt, P.C.

(57) ABSTRACT

Various methods and apparatuses associated with the serving of data from a wireless mobile phone, including a wireless mobile phone, are described herein.

40 Claims, 7 Drawing Sheets

| Client Computer (CC) ~ 104 | Domain Name Server (DNS) ~ 120 | Proxy Server (PS) ~ 122 | Wireless Mobile Phone (WMP) ~ 102 |
|---|---|---|---|
| Attempt Access with URL (WMP ph number) ~ 202<br><br>- Req DNS to resolve URL ~ 203<br>- Rec PS IP Addr ~ 205<br>- Connect to PS & req access ~ 207 | Resolve to & Notify Proxy Server ~ 204 | Determine whether WMP has an established data connection with PS ~ 206;<br><br>If not, message WMP to establish data connection ~ 208 | WMP establish data connection to PS ~ 210 |
| | | Rec and Fwd CC's req to WMP ~ 212<br><br>Rec and Fwd WMP's resp to CC ~ 216 | Rec CC' req & respond with Login page ~ 214 |
| Complete & submit Login ~ 218 | | Rec and Fwd CC's cmpl'd Login to WMP ~ 220<br><br>Rec and Fwd WMP's Login grant to CC ~ 226 | Rec CC' completed Login ~ 222<br><br>Determine and grant Login [TS [App]] ~ 224 |
| Interact with [TS [App]] ~ 228 | | Rec and Fwd CC's interaction with [TS[App]] ~ 230<br><br>Rec and Fwd WMP's [TS[App]] response ~ 234 | Process CC's interaction with [TS[App]] & respond ~ 232 |

| Client Computer (CC) ~104 | Domain Name Server (DNS) ~120 | Proxy Server (PS) ~122 | Wireless Mobile Phone (WMP) ~102 |
|---|---|---|---|
| Attempt Access with URL (WMP ph number) ~202 | Resolve to & Notify Proxy Server ~204 | | |
| - Req DNS to resolve URL ~203<br>- Rec PS IP Addr ~205<br>- Connect to PS & req access ~207 | | Determine whether WMP has an established data connection with PS ~206;<br><br>If not, message WMP to establish data connection ~208 | WMP establish data connection to PS ~210 |
| | | Rec and Fwd CC's req to WMP ~212<br><br>Rec and Fwd WMP's resp to CC ~216 | Rec CC' req & respond with Login page ~214 |
| Complete & submit Login ~218 | | Rec and Fwd CC's cmpl'd Login to WMP ~220<br><br>Rec and Fwd WMP's Login grant to CC ~226 | Rec CC' completed Login ~222<br><br>Determine and grant Login [TS [App]] ~224 |
| Interact with [TS [App]] ~228 | | Rec and Fwd CC's interaction with [TS[App]] ~230<br><br>Rec and Fwd WMP's [TS[App]] response ~234 | Process CC's interaction with [TS[App]] & respond ~232 |

Figure 2

SERVING DATA/APPLICATIONS FROM A WIRELESS MOBILE PHONE

RELATED APPLICATION

This application claims the benefit of priority from Provisional Application Ser. No. 60/581,864, filed Jun. 21, 2004, which specification is fully incorporated herein by reference

TECHNICAL FIELD

Embodiments of the present invention relates to the fields of telephony and data processing. More specifically, the present invention is related to serving data and/or application from a wireless mobile phone.

BACKGROUND OF THE INVENTION

Advances in semiconductor, processor, telecommunication, networking and related technologies have led to the ubiquitous availability of a wide range of general and special purpose computing devices. In particular, wireless mobile phones are now widely available and employed for voice communication. In some cases, wireless mobile phones have replaced desktop phones as the primary voice communication devices for many users.

At the same time, as the capabilities and functionality of wireless mobile phones continue to grow, wireless mobile phones have become the major repositories of the users' data. Today, very often, not only contacts and calendar data are stored on the wireless mobile phones, increasingly, word documents, presentations, including the viewers of the corresponding applications are stored thereon. In other words, increasingly, wireless mobile phones are also being employed to perform data processing functions that were once performed on traditional data processing devices, such as laptop or desktop computers.

However, by virtue of the portability characteristic, which inherently means small display screens and small keypads, wireless mobile phones, when used as data processing/computing devices, remain relatively user-unfriendly.

The term "wireless mobile phone" as used herein refers to the class of telephony devices equipped to make and receive calls wirelessly, notwithstanding movement, as long as the device is within the communication reach of a service or base station of a wireless network service provider. Unless specifically excluded, these terms are to include the analog subclass as well as the digital subclass (of all signaling protocols).

BRIEF DESCRIPTION OF THE DRAWINGS

The present invention will be described by way of exemplary embodiments, but not limitations, illustrated in the accompanying drawings in which like references denote similar elements, and in which:

FIG. 2 illustrates a protocol view of the interactions between the client computer, the domain name server, the proxy server and the wireless mobile phone of FIG. 1, in accordance with various embodiments;

DETAILED DESCRIPTION OF ILLUSTRATIVE EMBODIMENTS

Embodiments of the present invention include, but are not limited to, methods related to serving data and/or applications from wireless mobile phones, and apparatuses, such as client computers, domain name servers, proxy servers and wireless mobile phones equipped with appropriate logic to practice corresponding aspects of the methods.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Parts of the description will be presented in terms, such as data, uniform resource locator, resolution, notification, and so forth, consistent with the manner commonly employed by those skilled in the art to convey the substance of their work to others skilled in the art. As well understood by those skilled in the art, these quantities take the form of electrical, magnetic, RF, or optical signals capable of being stored, transferred, combined, and otherwise manipulated through electrical and/or optical components of a processor and its subsystems.

Part of the descriptions will employ various abbreviations, including but are not limited to:

| | |
|---|---|
| CDROM | Compact Disc Read Only Memory |
| DVD | Digital Versatile Disc |
| GPRS | Global Packet Radio Service |
| GSM | Global System for Mobile Communication |
| HTTP | HyperText Transfer Protocol |
| IEEE | Institute of Electrical and Electronic Engineers |
| RF | Radio Frequency |
| SMS | Short Messaging Service |
| Wi-Fi | Wireless Fidelity (IEEE 802.11a, b, g currently) |
| USB | Universal Serial Bus |

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising", "having", and "including" are synonymous, unless the context dictates otherwise.

Figure 1:
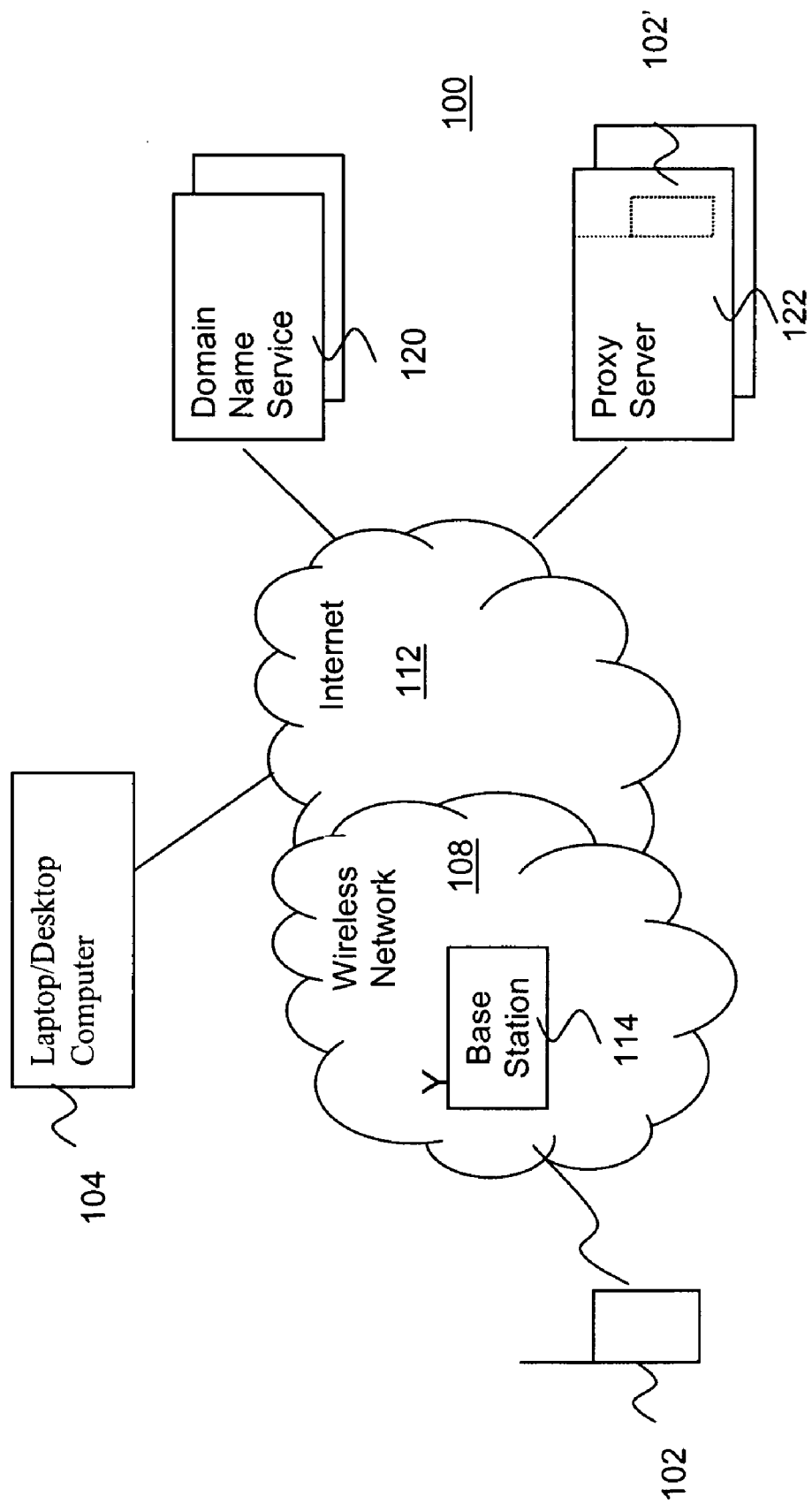
FIG. 1 illustrates an overview of the present invention, in accordance with various embodiments.

Referring now to FIG. 1, wherein a block diagram illustrating an overview of the present invention 100, in accordance with various embodiments, is shown. As illustrated and to be described more fully below, wireless mobile phone (WMP) 102 is equipped with hardware and/or software elements to serve data and/or applications stored thereon and/or mirrored, for another computing device, such as laptop/desktop computer 104. In various embodiments, WMP 102 or its logical mirror 102' effectuates the serving of data and applications for computing 104 by acting as a web server. In other embodiments, WMP 102 or its logical mirror 102' effectuates the serving of data and applications for computing 104 by acting as a terminal server, a print server, a file server, and/or servers of other types. The term "logical mirror" (hereinafter "mirror") as used herein refers to the reflected/synchronized portion of the logical content of WMP 102 for serving data and/or applications, which may or may not include the entire logical content of WMP 102.

Further, as will be also described in more detail below, for these embodiments, domain name servers 120 and proxy servers 122 are equipped to enable WMP 102 or its mirror 102' to effectuate the serving of data and applications for computing 104. That is, domain name servers 120 and proxy servers 122 are equipped with the logic and functions to bridge the fact that WMP 102 generally does not have a persistent connection to the Internet, nor a persistent IP address.

Resultantly, a user of WMP 102 may use someone else' computer, e.g. a visitor/co-worker's computer at a visiting location, a public computer at a public library/Internet café, and so forth, to perform data processing functions, using data and/or applications stored on WMP 102 (or on its mirror 102'), to overcome the inherent user unfriendliness of WMP 102 for performing data processing tasks.

Except for the logic/enhancements provided to WMP 102, domain name servers 102 and proxy servers 122, these and other enumerated elements may otherwise be implemented with a wide range of these elements known in the art or to be designed.

Referring now to FIG. 2, wherein a protocol view of the interactions between client computer 104, domain name servers 120, proxy server 122 and WMP 102 or its mirror 102', in accordance with various embodiments, is shown. As illustrated, for the embodiments, the serving of data from WMP 102 or its mirror 102' to client computer 104 may start with client computer 104 attempts to access WMP 102 using a conventional browser and a uniform resource locator (URL) that resolves to WMP 102 or its mirror 102'. In various embodiments, this URL includes an identifier of WMP 102, e.g. the telephone number assigned to WMP 102, and a URL like www.1234567890.wirelessphsvc.com or www.wirelessphsvc.com/1234567890, operation 202. In other embodiments, the URL may include a name of the owner of the telephone number assigned to WMP 102, e.g. "www.johnowner.wirelessphsvc.com" (where "johnowner" is the name of the owner of the telephone number "1234567890"). In still other embodiments, the URL may contain other identification information, including but not limited to identifier information generated based on identification information associated with the subscriber. The derivation algorithm or generation function may be any deterministic derivation algorithm or generation function.

As with conventional attempts to access a resource identified by an URL, the attempt results in a request being submitted to one of the domain name servers 120, operation 203. In various embodiments, client computer 104 submits the request over the communication protocol TCP/IP. In other embodiments, other communication protocols may be employed instead.

On receipt of the request, the domain name server 120 having previously stored a record resolving the URL to proxy server 122, resolves the request to proxy server 122 accordingly, operation 204. Additionally, for the embodiments, the domain name server 120 notifies proxy server 122 of the request to resolve a URL to WMP 102, operation 204. In various embodiments, domain name server 120 notifies proxy server 122 using the communication protocol TCP/IP. In other embodiments, other communication protocols may be employed instead.

On receipt of the notification, for the embodiments, proxy server 122 determines whether a data connection has already been established between WMP 102 and proxy server 122, operation 206. Proxy server 122 may make the determination by examining e.g. content of a data connection table/log it maintains or its communication stacks in memory.

If a data connection between WMP 102 and proxy server 122 has not already been established, and mirroring of WMP 102 is not implemented, proxy server 122 sends a message to WMP 102 informing WMP 102 that an attempt to access WMP 102 is in the process of being made, and assuming WMP 102 wants to service the access, WMP 102 should establish a data connection to the proxy server 122, operation 208. In various embodiments, proxy server 122 sends the message to WMP 102 in the form of a SMS message. In other embodiments, other messaging protocols may be employed instead.

In response, assuming WMP 102 does want to service the access, WMP 102 establishes a data connection with proxy server 122, operation 210. In various embodiments, WMP 102 establishes a data connection with proxy server 122 by establishing a GPRS or other connection.

In the meantime, on receipt of the resolution of the URL of WMP 102 to the proxy server 122 (e.g. by receiving the IP address of proxy server 122), operation 203, client computer 104 establishes a data communication connection to proxy server 122 to access WMP 102, operation 205. In various embodiments, client computer 104 establishes a HTTP connection to proxy server 122 to access WMP 102. In other embodiments, other data communication protocols may be employed instead.

On acceptance and establishment of the data communication connection from client computer 104, proxy server 122 forwards the access request of client computer 104 to WMP 102 (if a data connection is established), or WMP 102' (if a data connection to WMP 102 is not established, and mirroring is implemented), operation 212.

In response, for the embodiments, WMP 102/102' responds with a login page, operation 214. Proxy server 122, in turn, forwards the login page to the client computer 104, operation 216.

On receipt of the login page, assuming it is a legitimate login, the user completes the login page appropriately, which in due course, results in client computer 104 submitting a completed instance of the login page to proxy server 122, operation 218.

As before, on receipt of the completed instance of the login page, proxy server 122 forwards the completed instance to WMP 102/102', operation 220. On receipt, operation 222, WMP 102/102' determines whether the login page was appropriately completed, in particular, whether client computer 104 should be granted access, operation 224.

In alternate embodiments, in lieu of or in addition to the above described login approach, client computer 104 may be granted access to WMP 102/102' conditioned on the fact that it is a pre-authorized device, or it is proximally located from WMP 102. The former may e.g. be determined based on the IP address of client computer 104, e.g. when it is a known statically pre-allocated IP address. The latter may e.g. be verified based on location information, such as global positioning satellite (GPS) coordinates, provided by the devices. Further, the proximal location of the devices may be verified periodically, and the access may be revoked as soon as WMP 102 is no longer proximally located next to client computer 104.

Assuming client computer 104 should be granted access, for the embodiments, WMP 102/102' responds with a home page or a terminal server page having a number of applications for the user of client computer 104 to use, operation 224. As before, proxy server 122 forwards the home or terminal server with application page to client computer 104, operation 226.

On receipt, the user of client computer 104 interacts with one or more of the available applications, resulting in the interactions being sent back to proxy server 122, operation 228.

As before, on receipt of the interactions, proxy server 122 forwards the interactions to WMP 102/102', operation 230. On receipt, operation 232, WMP 102/102' processes the interactions and responds accordingly to proxy server 124, operation 230. Proxy server 124 again forwards the response to client computer 104, operation 234.

Operations 228-234 are repeated until the user of client computer 104 stops accessing WMP 102/102', or WMP 102/102' stops serving client computer 104 (for whatever reason).

For the embodiments supporting the implementation of mirror 102', a user of WMP 102 may cause a data connection to be established from WMP 102 to mirror 102' and synchronize their logical content, from time to time.

Thus, a user of WMP 102 may use a computer at a visiting location, with more user friendly display screen and keyboard for performing data processing tasks, using data and running applications stored on WMP 102.

In the foregoing description, for ease of understanding, the embodiments have been described with domain name server 120 notifying proxy server 122 of attempted access of WMP 102, thereby enabling proxy server 122 to ensure WMP 102 has a proper data connection established with proxy server 122. In alternate embodiments, the present invention may nonetheless be practiced without the alert notification. For examples, in alternate embodiments, the present invention may be practiced with the proxy server 122 serving up substitute pages while it is causing WMP 102 to establish its data connection to proxy server 122, or allowing the attempt to "fail" and retried.

Additionally, while mirror 102' is illustrated as being maintained by proxy server 122, in alternate embodiments, mirror 102' may be implemented on any networked servers, accessible to proxy server 122.

Further, in various embodiments, WMP 102 may be adapted to download a communication applet onto client computer 104 upon granting access to client computer 104. The communication applet may be adapted to collaborate with the proximally located WMP 102 to determine whether the serving of data and/or applications from WMP 102 may be switched to a local communication connection, such as a short range wireless connection or a wired serial or parallel connection.

Still further, in various embodiments, on granting access to client computer 104, WMP 102/102' may cause a security applet be downloaded onto client computer 104. The security applet is adapted to control caching of all data and/or applications downloaded from WMP 102/102' while accessing WMP 102/102', and destruction of the downloaded data and applications (possibly including itself) as soon as the access is terminated.

Of course, in various embodiments, the additional communication and security applets may be implemented as a single combined applet.

Still further, in other embodiments, the serving of data and/or applications from WMP 102/102' may be initiated by WMP 102, or even an authorized third party.

FIGS. 3a-3c and 4 illustrate WMP 102 in further detail, in accordance with various embodiments. As illustrated, for the embodiments, WMP 102 includes a fully functional base WMP unit 304 and a removable accessory cover 302, within which a personalization module (PM) 306 is disposed.

Figure 3A:
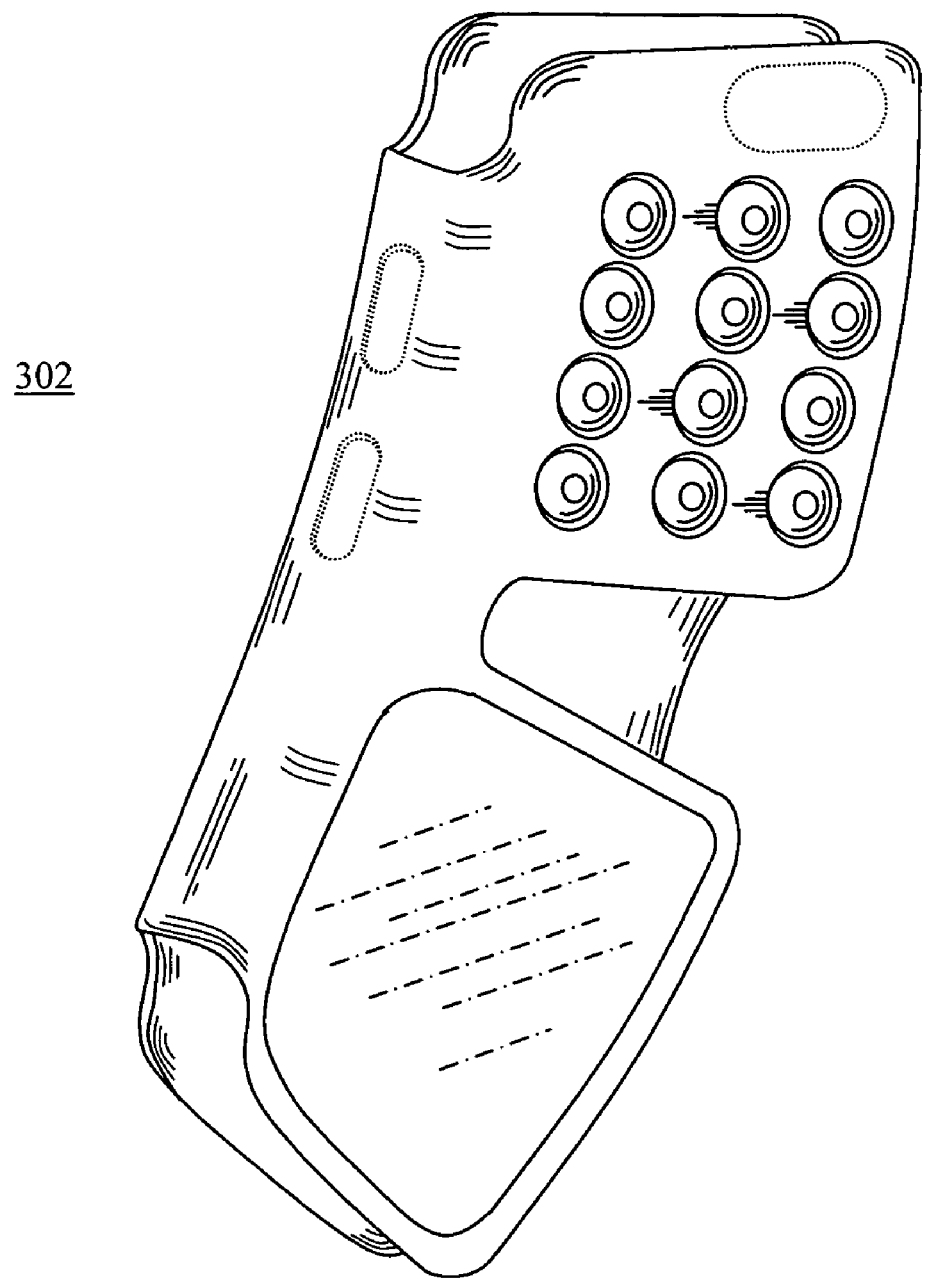
FIGS. 3a-3c illustrate the wireless mobile phone of FIG. 1 in further detail, in accordance with various embodiments.
Figure 3B:
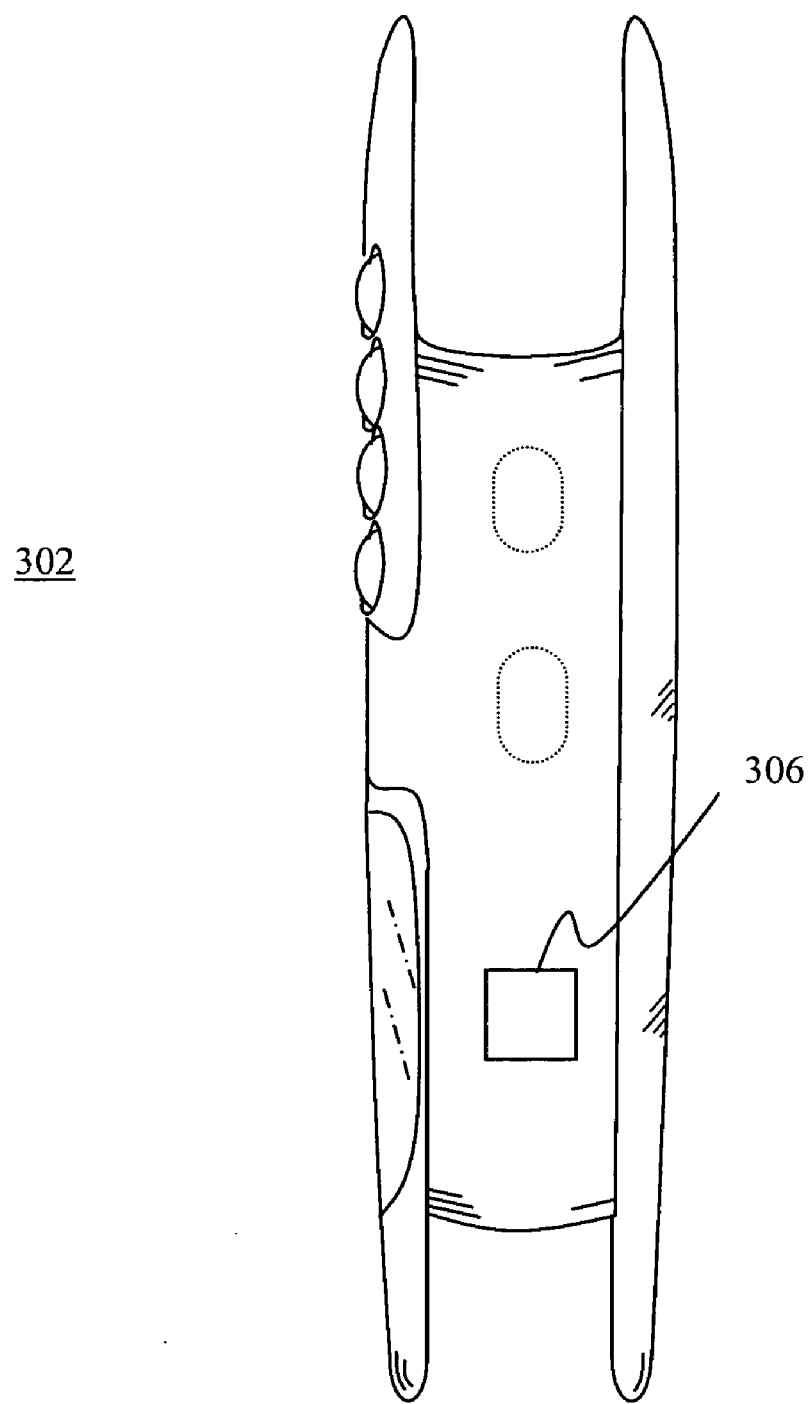

FIGS. 3a and 3b illustrate a perspective view and a side-view of removable accessory cover 302 respectively. For the embodiments, cover 302 has a substantially U-shaped cover body, and designed to be snapped onto the base WMP unit 304 via a substantially side way motion (as defined by the expected orientation of WMP 102). PM 306 is disposed at the inside surface of the mid-section of the U-shaped cover body 302. PM 306 may include data and/or instructions to personalize, customize and/or base WMP unit 304.

Figure 3C:
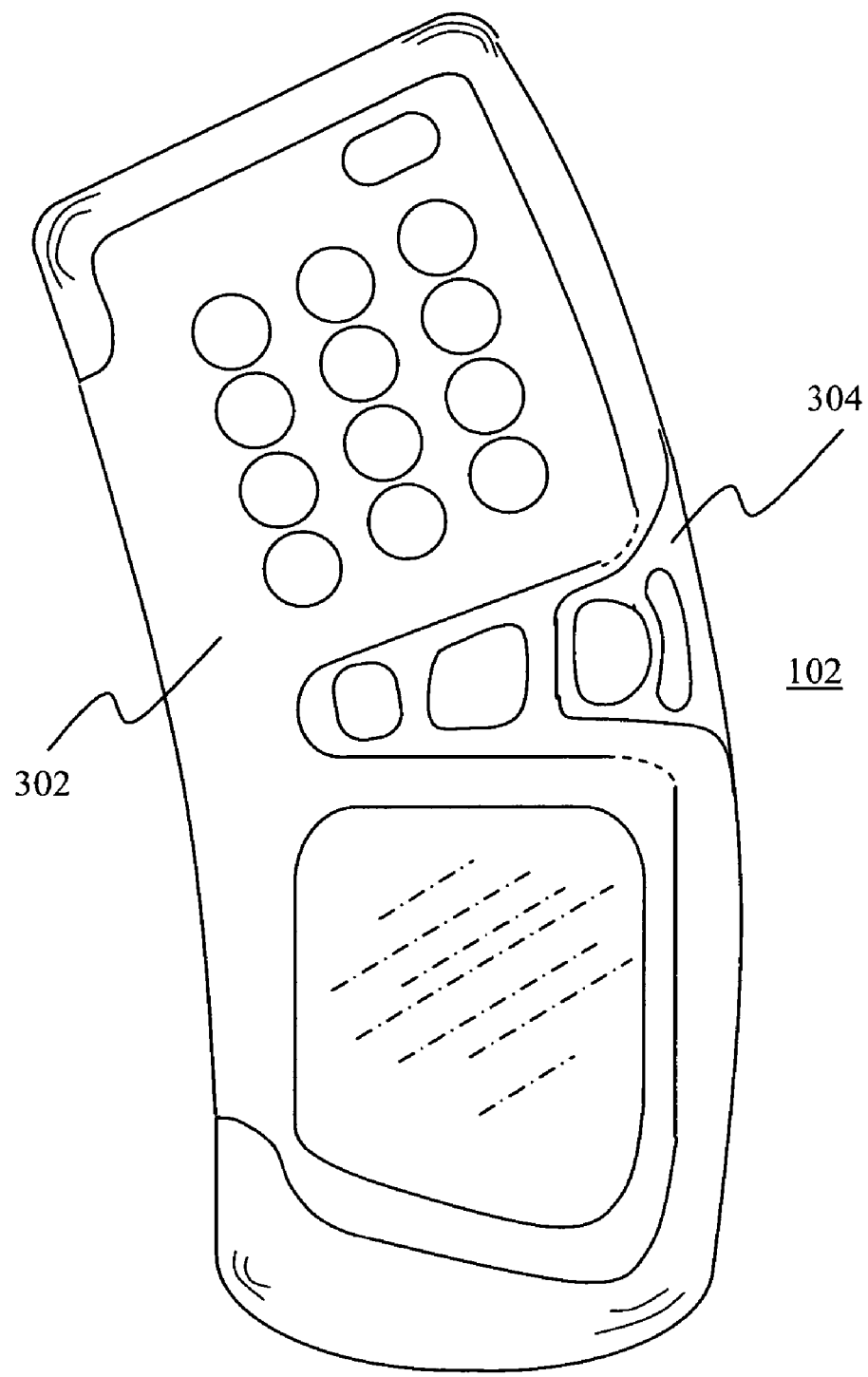

FIG. 3c illustrates a front view of the assembly, that is having removable accessory cover 302 and the base WMP unit 304 illustrated with cover 302 having been snapped on, i.e. attached, to the base WMP unit 304.

Resultantly, removable accessory cover 302 provides a convenient way of personalizing, customizing and/or enhancing base WMP unit 304, e.g. enhancing WMP unit 304 with a web server, an application server, a terminal server, and/or applications, for facilitating practice of embodiments of the present invention.

Figure 4:
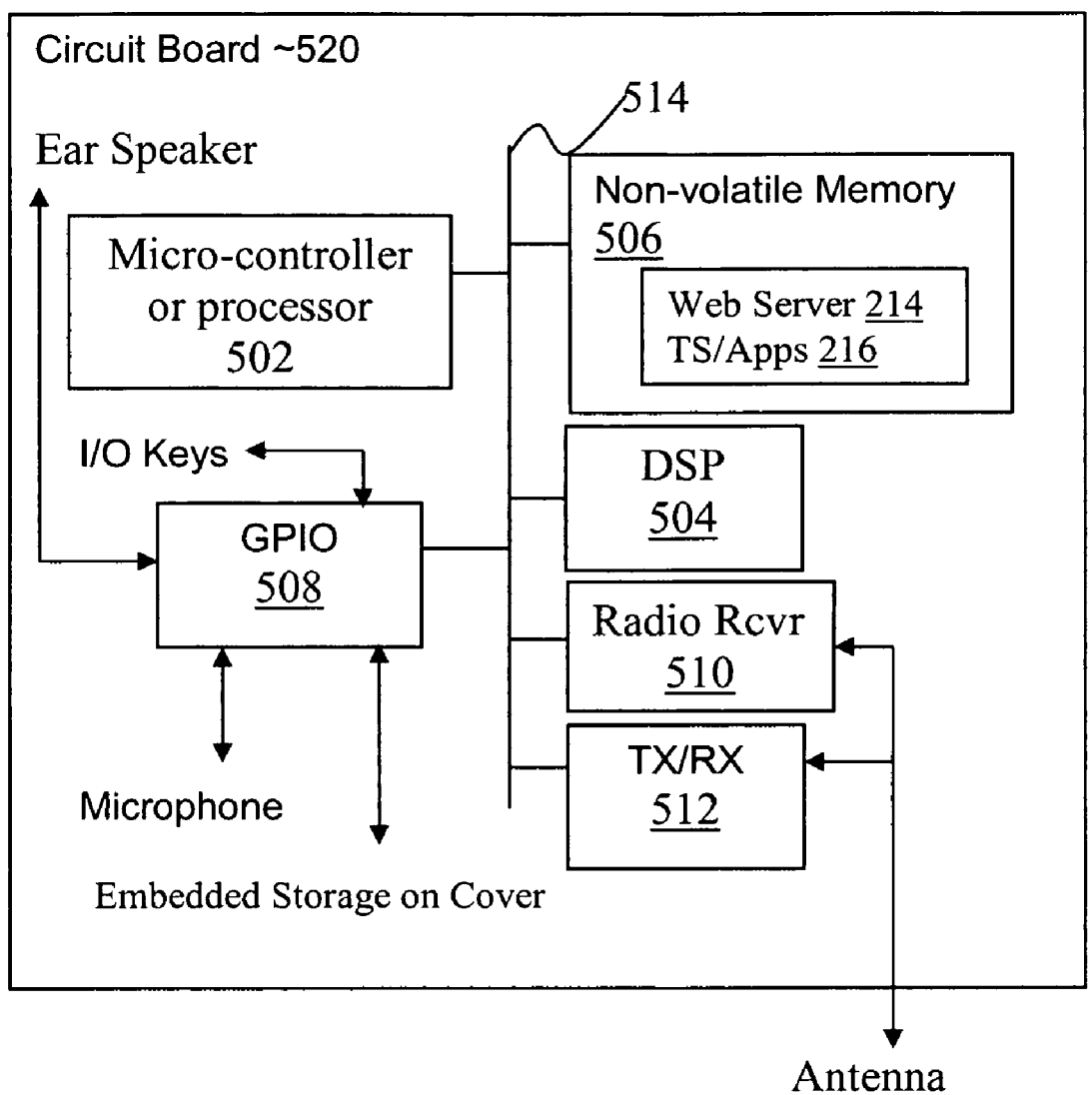
FIG. 4 illustrates an architecture view of the components of the wireless mobile phone of FIG. 3a-3c, in accordance with various embodiments.

FIG. 4 illustrate an architecture view of base WMP unit 304, in accordance with various embodiments. As illustrated, base WMP unit 304 includes elements found in conventional wireless mobile client devices, such as micro-controller/processor 502, digital signal processor (DSP) 504, non-volatile memory 506, general purpose input/output (GPIO) interface 508, radio receiver 510, and transmit/receive (TX/RX) 512 (also known as a transceiver), coupled to each other via bus 514, and disposed on a circuit board 520.

Additionally, base WMP unit 304 is endowed with a software implementation of web server 214 and/or terminal server having one or more applications 216, and other earlier described functionality for the practice of embodiments of the present invention.

Except for web server 214 and optionally, terminal server with one or more applications 216 provided to base WMP unit 304, each of these elements 502-514 performs its conventional function known in the art, and is intended to represent a broad range of such element and its equivalents. Further, TX/RX 512 may be designed to support one or more of any of the known signaling protocols, including but are not limited to CDMA, TDMA, GSM, and so forth. Moreover TX/RX 512 may be implemented using separate transmitter and receiver.

Accordingly, elements 502-514 will not be further described. Further, in alternate embodiments, WMP 102 may assume other form factors, including but not limited to a conventional substantially rectangular unibody form factor, or a conventional substantially rectangular flip/slider phone form factor, with or without a removable accessory cover or faceplate.

Figure 5:
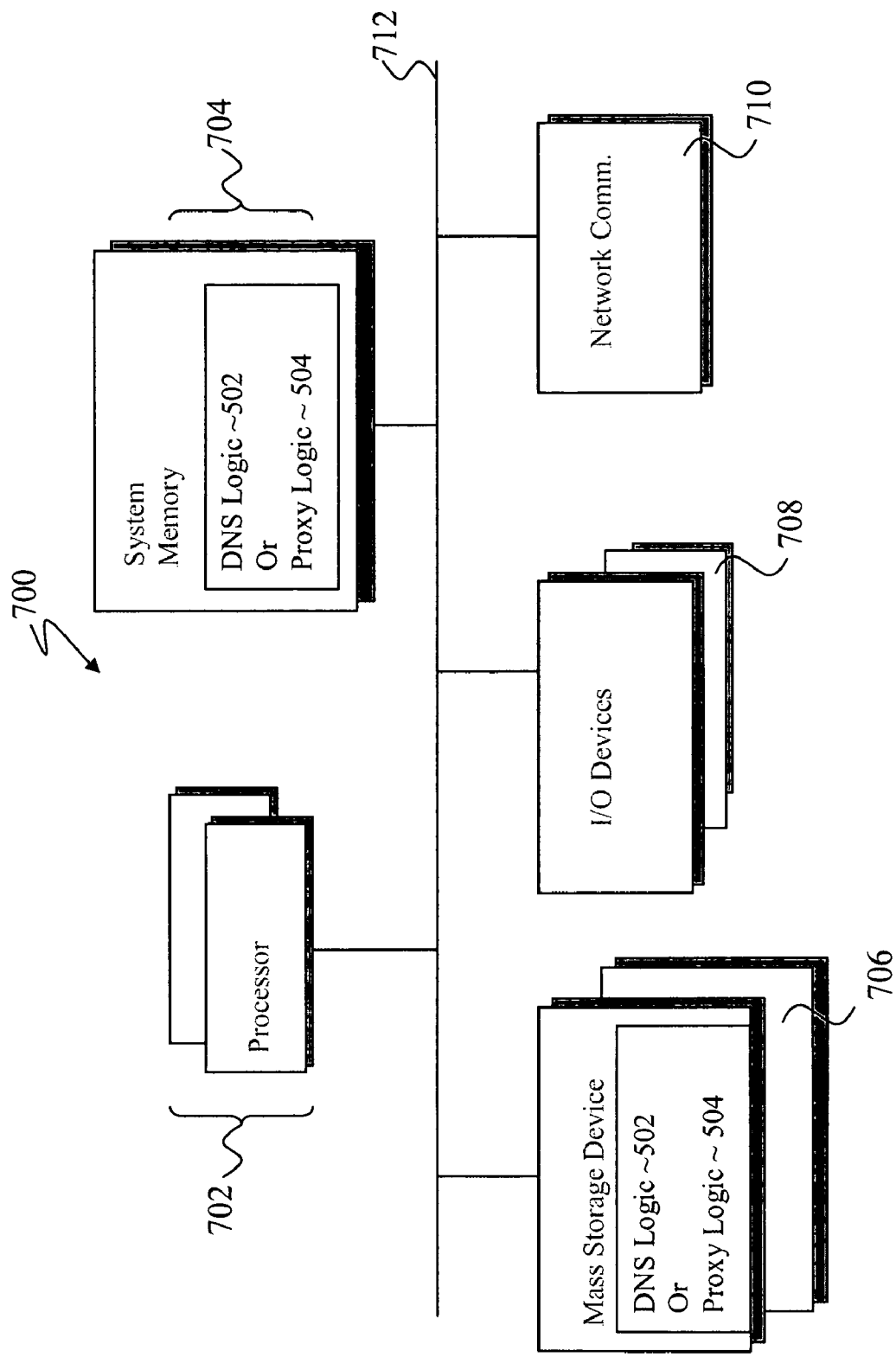
FIG. 5 illustrates an exemplary system suitable for use as domain name servers or proxy servers of FIG. 1, in accordance with various embodiments.

FIG. 5 illustrates an example computing device, suitable for use as domain name servers 120 and/or proxy server 122, in accordance with some embodiments. As illustrated, computing device 700 includes one or more processors 702, and system memory 704. Additionally, computing device 700 includes mass storage devices 706 (such as diskette, hard drive, CDROM, DVD and so forth), input/output devices 708

(such as keyboard, cursor control and so forth) and communication interfaces 710 (such as network interface cards, modems and so forth). The elements are coupled to each other via system bus 712, which represents one or more buses. In the case of multiple buses, they are bridged by one or more bus bridges (not shown).

Each of these elements performs its conventional functions known in the art. In particular, system memory 704 and mass storage 706 are employed to store a working copy and a permanent copy (not shown) of the programming instructions implementing domain name service 502 or proxy service 504, depending on whether computing device 700 is employed to implement domain name server 120 or proxy server 122.

The permanent copy of the programming instructions may be loaded into mass storage 706 in the factory, or in the field, through e.g. a distribution medium (not shown) or through communication interface 710 (from a distribution server (not shown).

The constitution of these elements 702-712 are known, and accordingly will not be further described.

Thus, it can be seen from the above descriptions, a novel method for serving data/applications from a wireless mobile phone, and apparatuses equipped to practice various aspects of the method, have been described. While the present invention has been described in terms of the earlier described embodiments, those skilled in the art will recognize that the invention is not limited to the embodiments described. The present invention can be practiced with modification and alteration within the spirit and scope of the appended claims of the non-provisional application to follow. Thus, the description is to be regarded as illustrative instead of restrictive on the present invention.

What is claimed is:

1. A method for serving data or application from a wireless mobile phone, wherein the data or application is on the wireless mobile phone, the method comprising:
    storing by a domain name service, a record to resolve a uniform resource locator associated with the wireless mobile phone to a proxy server, wherein the uniform resource locator is for locating the data or application on the wireless mobile phone;
    receiving by the domain name service, from a computing or communication device attempting to access the data or application on the wireless mobile phone, a request to resolve the uniform resource locator to the wireless mobile phone;
    resolving by the domain name service, the uniform resource locator associated with the wireless mobile phone to the proxy server; and
    sending to the proxy server, by the domain name service, a notification of the request to resolve the uniform resource locator to the wireless mobile phone.

2. The method of claim 1, wherein the uniform resource locator comprises an identifier of the wireless mobile phone, and wherein the identifier further comprises at least one of a telephone number or a name of the user of the wireless mobile phone.

3. An apparatus comprising:
    means for storing executable instructions operable, upon execution, to practice the method set forth in claim 1; and
    means for executing the stored executable instructions.

4. A method for serving data or application from a wireless mobile phone, wherein the data or application is on the wireless mobile phone, the method comprising:
    receiving by a proxy server of the wireless mobile phone, from a domain name service, a notification of a request received by the domain name service from a computing or communication device to resolve a uniform resource locator to the wireless mobile phone, wherein the uniform resource locator is for locating the data or application on the wireless mobile phone;
    determining by the proxy server, in response to the notification from the domain name service, whether a data connection between the proxy server and the wireless mobile phone has been established; and
    the proxy server notifying the wireless mobile phone to establish the data connection if it is determined that the data connection has not been established.

5. The method of claim 4, wherein said notifying comprises the proxy server sending a notification message to the wireless mobile phone in accordance with a messaging protocol.

6. The method of claim 5, wherein the notifying further comprises the proxy server notifying the wireless mobile phone that an attempt to access the wireless phone is being made.

7. The method of claim 4, further comprising:
    accepting by the proxy server, from the computing or communication device, a data communication connection from the computing or communication device, the data communication connection being established by the computing or communication device; and
    the proxy server forwarding the request to the wireless mobile phone.

8. The method of claim 7, further comprising:
    receiving, by the proxy server, from the wireless mobile phone, a login page;
    forwarding by the proxy server, to the computing or communication device, the login page;
    receiving by the proxy server, from the computing or communication device, a completed instance of the login page; and
    the proxy server forwarding the completed instance of the login page to the wireless mobile phone.

9. The method of claim 4, further comprising receiving by the proxy server, from the wireless mobile phone, a home page or terminal server page, and the proxy server forwarding the home page or terminal server page to the computing or communication device.

10. The method of claim 9, wherein the home page or terminal server page includes an application available via a terminal server on the wireless mobile phone.

11. The method of claim 10, further comprising receiving by the proxy server, from the computing or communication device, an interaction with the terminal server to execute the application on the wireless mobile phone, and the proxy server forwarding the interaction to the wireless mobile phone.

12. The method of claim 11, wherein the application is a selected one of a word processing application, a presentation application, a spreadsheet application, and a database application.

13. An apparatus comprising:
    a memory having executable instructions operable, upon execution, to practice the method set forth in claim 1; and
    a processor configured to execute the stored executable instructions.

14. A method for serving data or application from a wireless mobile phone, wherein the data or application is on the wireless mobile phone, the method comprising:
    receiving by a proxy server, from a domain name service, a notification of a request received by the domain name service from a computing or communication device to resolve a uniform resource locator to the wireless mobile phone, wherein the uniform resource locator is for locating the data or application on the wireless mobile phone;

receiving by the proxy server, from the computing or communication device, an access request to access the wireless mobile phone;

determining, by the proxy server, that a data connection between the wireless mobile phone and a data network has not been established; and forwarding the access request, by the proxy server, to a logical mirror of the wireless mobile phone in response to said determining.

15. The method of claim 14, further comprising sending, by the proxy server, a notification message to the wireless mobile phone in accordance with a messaging protocol.

16. The method of claim 15, wherein the messaging protocol is SMS.

17. The method of claim 14, further comprising receiving by the proxy server, from the computing or communication device, a completed instance of a login page for the wireless mobile phone, and the proxy server forwarding the completed instance of the login page to the logical mirror of the wireless mobile phone.

18. The method of claim 14, further comprising receiving by the proxy server, from the computing or communication device, a request to access a resource on the wireless mobile phone, and the proxy server forwarding the request to the logical mirror of the wireless mobile phone.

19. An apparatus comprising:
means for storing executable instructions designed to practice the method set forth in claim 14; and
means for executing the stored executable instructions.

20. A method for serving data or application from a wireless mobile phone, wherein the data or application is on the wireless mobile phone, the method comprising:
receiving, by the wireless mobile phone, a notification message from a proxy server of the wireless mobile phone notifying the wireless mobile phone to establish a data connection to a data network, wherein the notification message is sent by the proxy server after determining by the proxy server that a data connection between the wireless mobile phone and the data network has not been established, and wherein the determining by the proxy server is in response to the proxy server receiving a notification, from a domain name service, of a request received by the domain name service from a computing or communication device to resolve a uniform resource locator to the wireless mobile phone, wherein the uniform resource locator is for locating the data or application on the wireless mobile phone; and
the wireless mobile phone establishing the data connection in accordance with a data communication protocol.

21. The method of claim 20, wherein the messaging protocol is SMS, and the data communication protocol is GPRS.

22. The method of claim 20, further comprising the wireless mobile phone serving to the computing device, via the proxy server, a login page for the wireless mobile phone.

23. The method of claim 22, further comprising receiving by the wireless mobile phone, from the computing or communication device, via the proxy server, a completed instance of the login page, and the wireless mobile phone determining whether the login is to be granted.

24. The method of claim 23, further comprising receiving by the wireless mobile phone, from the computing or communication device, a request to access the data or application on the wireless mobile phone.

25. The method of claim 24, wherein the data or application is data or application accessible via a terminal server on the wireless mobile phone.

26. The method of claim 25, further comprising receiving by the wireless mobile phone, from the computing or communication device, interaction with the terminal server to execute an application on the wireless mobile phone.

27. The method of claim 26, wherein the application is a selected one of a word processing application, a presentation application, a spreadsheet application, and a database application.

28. A wireless mobile phone comprising:
means for storing executable instructions designed to practice the method set forth in claim 20; and
means for executing the stored executable instructions.

29. The wireless mobile phone of claim 28, wherein at least some of the executable instructions implement a web server.

30. A cover comprising:
means for removably mating with a wireless mobile phone; and
means for storing executable instructions designed to at least contribute to the wireless mobile phone's practicing of the method set forth in claim 20.

31. The cover of claim 30, further comprising means for executing the executable instructions.

32. A method for serving data or application from a wireless mobile phone, wherein the data or application is on the wireless mobile phone, the method comprising:
sending to a domain name service, by a client computing or communication device, a request to resolve a uniform resource locator to the wireless mobile phone, wherein the uniform resource locator is for locating the data or application on the wireless mobile phone, and wherein said domain name service sends a notification of the request to a proxy server;
receiving by the client computing or communication device, an IP address associated with the proxy server of the wireless mobile phone, from the domain name service, wherein the proxy server notifies the wireless mobile phone to establish a data connection between the wireless mobile phone and the proxy server;
establishing, by the client computing or communication device, a data communication connection with the proxy server; and
accessing by the client computing or communication device, a login page of the wireless mobile phone via the proxy server at the IP address.

33. The method of claim 32, further comprising receiving by the client computing or communication device from the wireless mobile phone, via the proxy server, the login page, and submitting by the client computing or communication device to the wireless mobile phone, via the proxy server, a completed instance of the login page.

34. The method of claim 33, further comprising the computing or communication device accessing the data or application on the wireless mobile phone upon successful logging onto the wireless mobile phone.

35. The method of claim 34, wherein the data or application is data or application available via a terminal server on the wireless mobile phone.

36. The method of claim 35, further comprising the client computing or communication device providing interactions with the terminal server to the wireless mobile phone to execute the application on the wireless mobile phone.

37. The method of claim 36, wherein the application is a selected one of a word processing application, a presentation application, a spreadsheet application, and a database application.

38. An apparatus comprising:
 means for storing executable instructions designed to practice the method set forth in claim 32; and
 means for executing the stored executable instructions.

39. The apparatus of claim 38, wherein at least some of the executable instructions implement a browser.

40. The apparatus of claim 38, wherein the apparatus is a selected one of a laptop computer and a desktop computer.

* * * * *